United States Patent
Dabak et al.

(10) Patent No.: US 7,039,036 B1
(45) Date of Patent: May 2, 2006

(54) REDUCED COMPLEXITY PRIMARY AND SECONDARY SYNCHRONIZATION CODES WITH GOOD CORRELATION PROPERTIES FOR WCDMA

(75) Inventors: Anand G. Dabak, Richardson, TX (US); Alan Gatherer, Richardson, TX (US); Sundararajan Sriram, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/316,193

(22) Filed: May 21, 1999

Related U.S. Application Data

(60) Provisional application No. 60/127,308, filed on Apr. 1, 1999, provisional application No. 60/128,648, filed on Apr. 9, 1999, provisional application No. 60/129,659, filed on Apr. 16, 1999, provisional application No. 60/130,587, filed on Apr. 22, 1999, provisional application No. 60/132,857, filed on May 6, 1999.

(51) Int. Cl.
*H04B 7/216* (2006.01)
(52) U.S. Cl. ............... 370/342; 370/335; 370/441; 370/503; 375/143; 375/150
(58) Field of Classification Search .............. 370/342, 370/335, 320, 310, 203, 204, 479, 205, 208, 370/212, 213, 441, 350, 503; 375/140, 143, 375/145, 149, 152, 147, 150
See application file for complete search history.

(56) References Cited

U.S. PATENT DOCUMENTS

| | | | |
|---|---|---|---|
| 4,441,184 A * | 4/1984 | Sonoda et al. ............... 714/755 |
| 6,330,292 B1 * | 12/2001 | Dent et al. ................... 375/142 |
| 6,343,094 B1 * | 1/2002 | Yamamoto ................... 370/335 |
| 6,349,109 B1 * | 2/2002 | Lattard et al. ............... 375/140 |
| 6,363,106 B1 * | 3/2002 | Popovic et al. .............. 375/150 |
| 6,373,859 B1 * | 4/2002 | Jedwab et al. .............. 370/479 |
| 6,393,047 B1 * | 5/2002 | Popovic' ..................... 370/342 |
| 6,567,482 B1 * | 5/2002 | Popovic' ..................... 375/343 |
| 6,404,732 B1 * | 6/2002 | van Nee ...................... 370/209 |
| 6,404,826 B1 * | 6/2002 | Schmidl et al. .............. 375/340 |

(Continued)

OTHER PUBLICATIONS

"Synchronization Channel With Cyclic Hierarchical Sequences", *Nortel Networks, TSG-RAN Working Group 1 Meeting #2*, TSGR1 #2 (99)090, Feb. 1999, pp. 1-19.

(Continued)

*Primary Examiner*—CongVan Tran
(74) *Attorney, Agent, or Firm*—Ronald O. Neerings; Wade James Brady, III; Frederick J. Telecky, Jr.

(57) ABSTRACT

A circuit for processing binary sequences is designed with a plurality of stages (530–534) coupled to provide plural signal paths (526,528). Each stage includes respective signal paths (550,562) for a first $R_a^{-1}(k)$ and a second $R_b^{-1}(k)$ data sequence. Each stage further includes a respective delay circuit (502) having a different delay from said respective delay circuit of each other stage (504,506) of the plurality of stages. A stage having a greatest delay (502) precedes other stages (504,506) in the plurality of stages of at least one of the plural signal paths.

25 Claims, 14 Drawing Sheets

U.S. PATENT DOCUMENTS

| | | | |
|---|---|---|---|
| 6,424,642 B1 * | 7/2002 | Schmidl et al. | 370/342 |
| 6,480,503 B1 * | 11/2002 | Yamaguchi et al. | 370/441 |
| 6,507,604 B1 * | 1/2003 | Kuo | 375/148 |
| 6,633,766 B1 * | 10/2003 | van der Pol | 455/522 |
| 6,775,260 B1 * | 8/2004 | Dabak et al. | 370/342 |
| 6,862,275 B1 * | 3/2005 | Dabak | 370/342 |
| 6,865,218 B1 * | 3/2005 | Sourour | 375/148 |
| 2003/0095529 A1 * | 5/2003 | Petre et al. | 370/342 |

OTHER PUBLICATIONS

"A New Hierarchical Correlation Sequence With Good Properties In Presence Of A Frequency Error", *Siemens, TSG-RAN Working Group 1 (Radio) Meeting #3*, TSGR#3 (99)146, Mar. 1999, pp. 1-8.

"New RACH Preambles With Low Auto-Correlation Sidelobes And Reduced Detector Complexity", *Ericsson, TSG-RAN Working Group 1 Meeting #3*, Mar. 1999, pp. 1-7.

"Spreading and Modulation (FDD)", *Siemens*, 3GPP, TS S1.13 V2.0.0 (Apr. 1999), *Technical Specification*, pp. 2-26.

"Efficient Pulse Compressor For Golay Complementary Sequences", *Electronics Letters*, vol. 27, No. 3, Jan. 31, 1991, pp. 219-220.

* cited by examiner

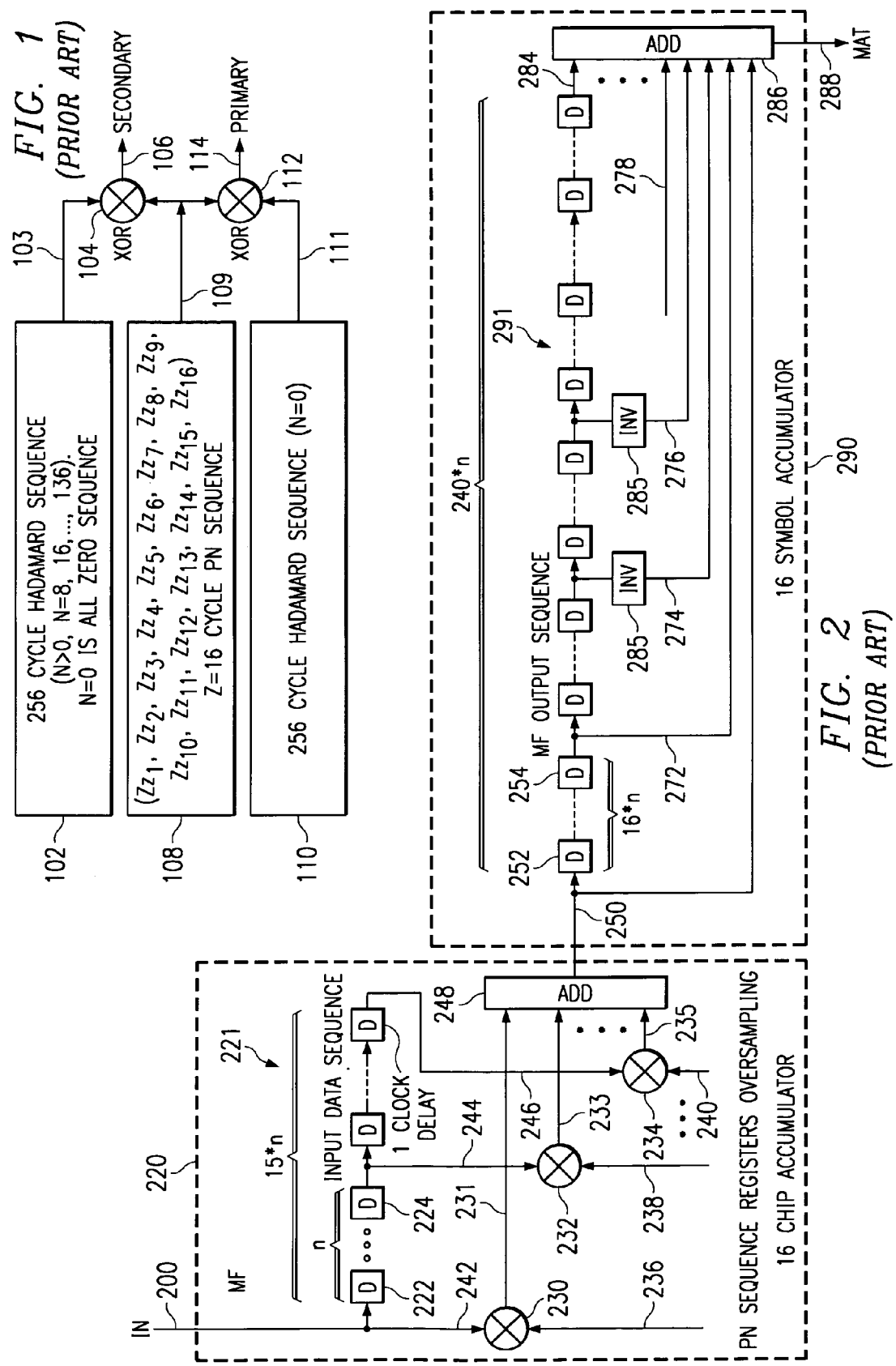

| MAXIMUM OFF-PEAK APERIODIC CROSS CORRELATION FROM THE (SSC+PSC) TO PSC | HIERARCHICAL HADAMARD SEQUENCES ($\alpha$) | GOLAY SEQUENCES ($\beta$) | EXPECTED GAIN FOR GOLAY SEQUENCES (dB) $20*\log 10((256-\beta)/(256-\alpha))$ |
|---|---|---|---|
| COMMA FREE CODE 1 | 87 | 47 | 1.8 |
| COMMA FREE CODE 2 | 81 | 44 | 1.7 |
| COMMA FREE CODE 3 | 75 | 46 | 1.3 |
| COMMA FREE CODE 4 | 95 | 43 | 2.4 |
| COMMA FREE CODE 5 | 113 | 46 | 3.4 |
| COMMA FREE CODE 6 | 78 | 48 | 1.3 |
| COMMA FREE CODE 7 | 94 | 43 | 2.4 |
| COMMA FREE CODE 8 | 85 | 43 | 1.9 |
| COMMA FREE CODE 9 | 87 | 43 | 2.0 |
| COMMA FREE CODE 10 | 96 | 43 | 2.5 |
| COMMA FREE CODE 11 | 91 | 40 | 2.4 |
| COMMA FREE CODE 12 | 87 | 44 | 1.9 |
| COMMA FREE CODE 13 | 93 | 46 | 2.2 |
| COMMA FREE CODE 14 | 94 | 44 | 2.3 |
| COMMA FREE CODE 15 | 85 | 47 | 1.8 |
| COMMA FREE CODE 16 | 89 | 40 | 2.3 |
| COMMA FREE CODE 17 | 75 | 44 | 1.4 |
| COMMA FREE CODE 18 | 99 | 45 | 2.5 |
| COMMA FREE CODE 19 | 95 | 43 | 2.5 |
| COMMA FREE CODE 20 | 103 | 43 | 2.9 |
| COMMA FREE CODE 21 | 90 | 46 | 2.0 |
| COMMA FREE CODE 22 | 67 | 43 | 1.0 |
| COMMA FREE CODE 23 | 87 | 43 | 2.0 |
| COMMA FREE CODE 24 | 78 | 45 | 1.5 |
| COMMA FREE CODE 25 | 87 | 45 | 2.0 |
| COMMA FREE CODE 26 | 88 | 43 | 2.0 |
| COMMA FREE CODE 27 | 74 | 45 | 1.3 |
| COMMA FREE CODE 28 | 70 | 46 | 1.1 |
| COMMA FREE CODE 29 | 104 | 44 | 2.9 |
| COMMA FREE CODE 30 | 87 | 45 | 1.9 |
| COMMA FREE CODE 31 | 80 | 42 | 1.7 |
| COMMA FREE CODE 32 | 82 | 45 | 1.7 |

*FIG. 9C*

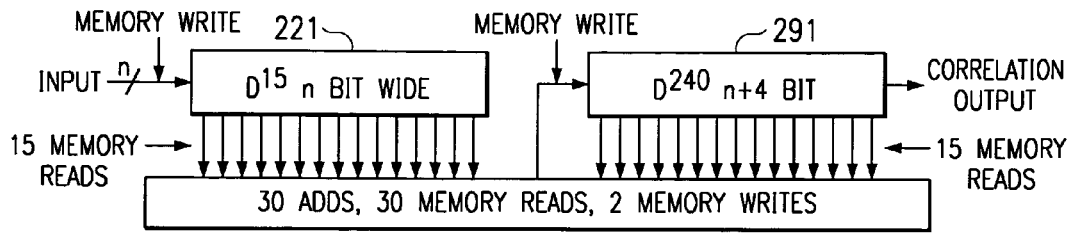

FIG. 10A
*(PRIOR ART)*

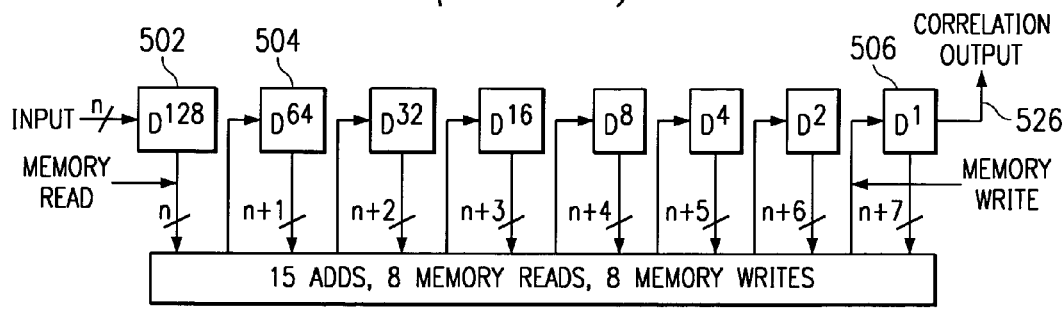

FIG. 10B

| | HIERARCHICAL SEQUENCE | GOLAY SEQUENCE |
|---|---|---|
| NUMBER OF DELAY ELEMENTS | 255 | 255 |
| NUMBER OF ADDS PER OUTPUT SAMPLE | 30 | 15 |
| NUMBER OF MEMORY READS PER OUTPUT SAMPLE | 30 | 8 |
| NUMBER OF MEMORY WRITES PER OUTPUT SAMPLE | 2 | 8 |
| POWER CONSUMPTION FOR ONE ADD | x | x |
| POWER CONSUMPTION FOR ONE MEMORY READ | 5x | 5x |
| POWER CONSUMPTION FOR ONE MEMORY WRITE | 10x | 10x |
| POWER CONSUMPTION OF ADDS PER OUTPUT SAMPLE | 30x | 15x |
| POWER CONSUMPTION OF MEMORY READS PER OUTPUT SAMPLE | 150x | 40x |
| POWER CONSUMPTION OF MEMORY WRITES PER OUTPUT SAMPLE | 20x | 80x |
| TOTAL POWER CONSUMPTION PER OUTPUT SAMPLE | 200x | 135x |
| REDUCTION IN POWER CONSUMPTION FOR GOLAY SCHEME OVER HIERARCHICAL SCHEME | | (1−135/200) =35% |
| POWER CONSUMPTION FOR STAGE 1 OF ACQUISITION | IF, 20 mW | then, 13 mW |
| POWER CONSUMPTION FOR STAGE 1 OF ACQUISITION | IF, 10 mW | then, 7.0 mW |
| POWER CONSUMPTION FOR STAGE 1 OF ACQUISITION | IF, 5 mW | then, 3.5 mW |
| MEMORY REQUIRED | 512n+1920 | 512n+494 |
| MEMORY REQUIRED, n=5 BITS | 4480 BITS | 3054 BITS |
| MEMORY SAVINGS, n=5 BITS | | 32% |
| MEMORY REQUIRED, n=6 BITS | 4992 BITS | 3566 BITS |
| MEMORY SAVINGS, n=6 BITS | | 29% |
| MEMORY REQUIRED, n=8 BITS | 6016 BITS | 4590 BITS |
| MEMORY SAVINGS, n=8 BITS | | 24% |

FIG. 10C

|  | HIERARCHICAL SEQUENCE | GOLAY SEQUENCE |
|---|---|---|
| NUMBER OF DELAY ELEMENTS | 255 | 255 |
| NUMBER OF ADDS PER OUTPUT SAMPLE | 30 | 15 |
| NUMBER OF MEMORY READS PER OUTPUT SAMPLE | 15 | 4 |
| NUMBER OF MEMORY WRITES PER OUTPUT SAMPLE | 1 | 4 |
| NUMBER OF REGISTER READS PER OUTPUT SAMPLE | 15 | 4 |
| NUMBER OF REGISTER WRITES PER OUTPUT SAMPLE | 1 | 4 |
| POWER CONSUMPTION FOR ONE ADD | x | x |
| POWER CONSUMPTION FOR ONE MEMORY READ | 5x | 5x |
| POWER CONSUMPTION FOR ONE MEMORY WRITE | 10x | 10x |
| POWER CONSUMPTION FOR ONE REGISTER READ | x | x |
| POWER CONSUMPTION FOR ONE REGISTER WRITE | x | x |
| POWER CONSUMPTION OF ADDS PER OUTPUT SAMPLE | 30x | 15x |
| POWER CONSUMPTION OF MEMORY READS PER OUTPUT SAMPLE | 75x | 20x |
| POWER CONSUMPTION OF MEMORY WRITES PER OUTPUT SAMPLE | 10x | 40x |
| POWER CONSUMPTION OF REGISTER READS PER OUTPUT SAMPLE | 15x | 4x |
| POWER CONSUMPTION OF REGISTER WRITES PER OUTPUT SAMPLE | x | 4x |
| TOTAL POWER CONSUMPTION PER OUTPUT SAMPLE | 131x | 83x |
| REDUCTION IN POWER CONSUMPTION FOR GOLAY SCHEME OVER HIERARCHICAL SCHEME |  | (1−83/131) =37% |
| POWER CONSUMPTION FOR STAGE 1 OF ACQUISITION | IF, 20 mW | then, 12.6 mW |
| POWER CONSUMPTION FOR STAGE 1 OF ACQUISITION | IF, 10 mW | then, 6.3 mW |
| POWER CONSUMPTION FOR STAGE 1 OF ACQUISITION | IF, 5 mW | then, 3.2 mW |
| MEMORY REQUIRED | 480n+1920 | 480n+352 |
| MEMORY REQUIRED, n=5 BITS | 4320 BITS | 2752 BITS |
| MEMORY SAVINGS, n=5 BITS |  | 37% |
| MEMORY REQUIRED, n=6 BITS | 4800 BITS | 3232 BITS |
| MEMORY SAVINGS, n=6 BITS |  | 33% |
| MEMORY REQUIRED, n=8 BITS | 5760 BITS | 4192 BITS |
| MEMORY SAVINGS, n=8 BITS |  | 27% |

*FIG. 11C*

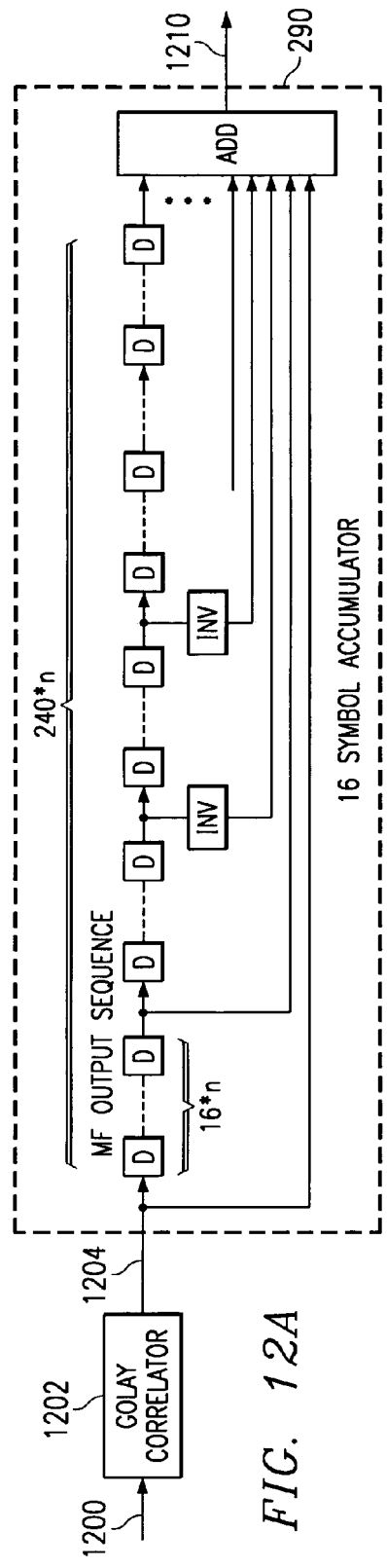
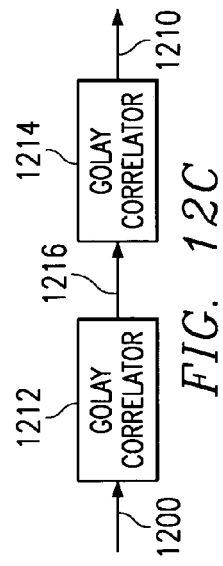
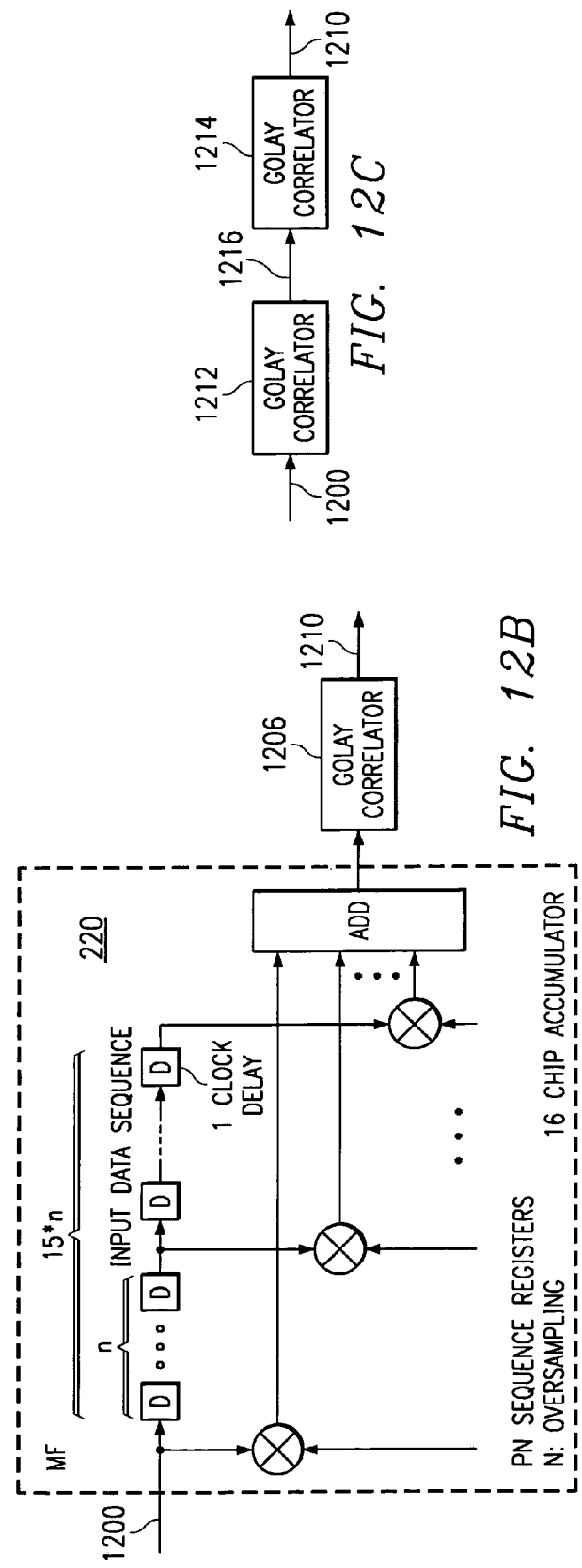
FIG. 12A
FIG. 12B
FIG. 12C

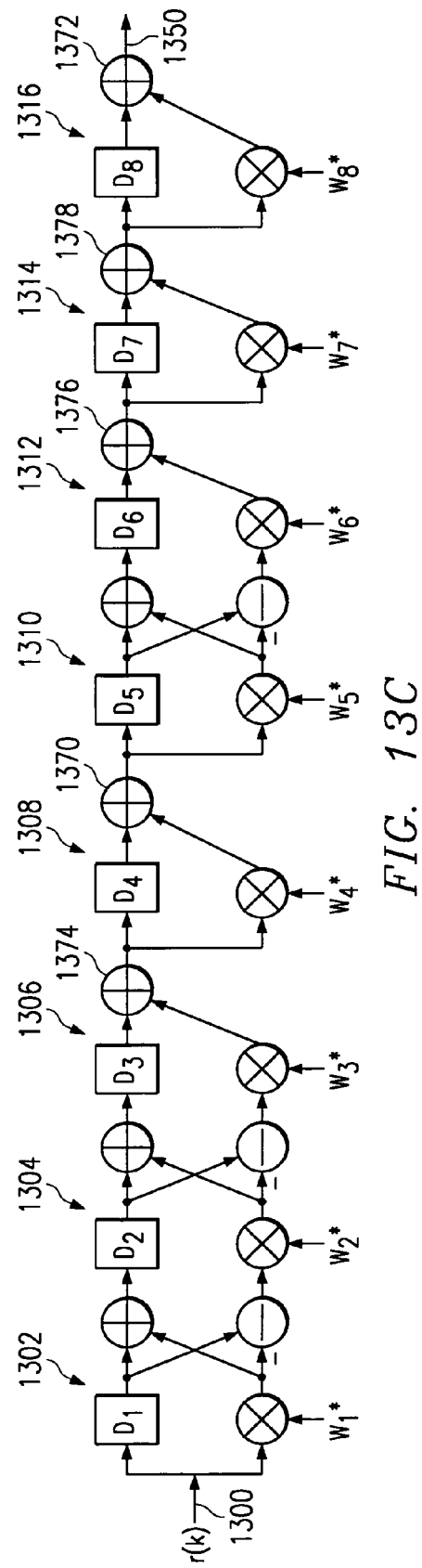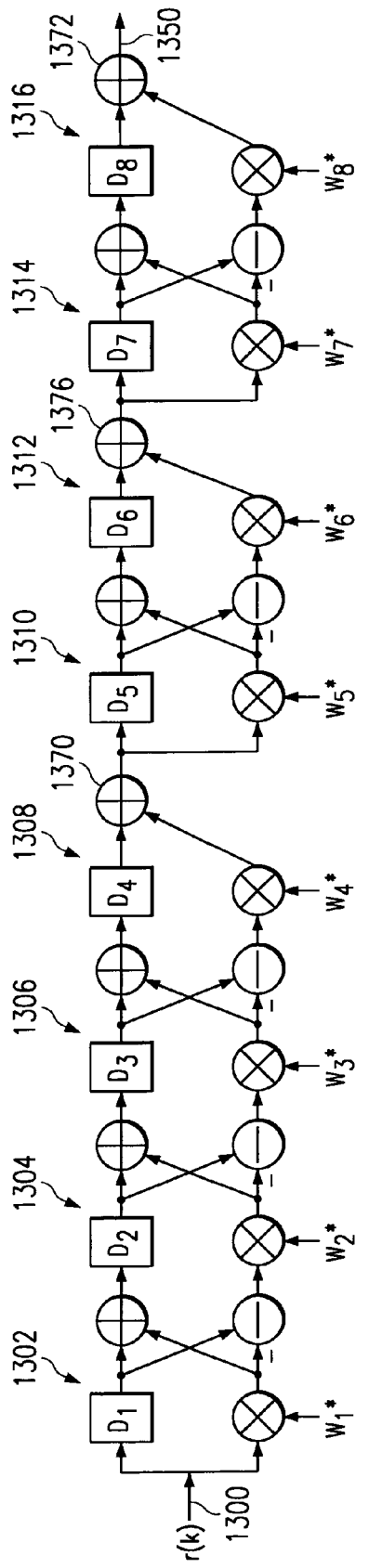

US 7,039,036 B1

REDUCED COMPLEXITY PRIMARY AND SECONDARY SYNCHRONIZATION CODES WITH GOOD CORRELATION PROPERTIES FOR WCDMA

CLAIM TO PRIORITY OF PROVISIONAL APPLICATION

This application claims priority under 35 U.S.C. § 119(e)(1) of provisional application No. 60/127,308, filed Apr. 1, 1999; provisional application No. 60/128,648, filed Apr. 9, 1999; provisional application No. 60/129,659, filed Apr. 16, 1999; provisional application No. 60/130,587, filed Apr. 22, 1999; and provisional application No. 60/132,857, filed May 6, 1999.

FIELD OF THE INVENTION

This invention relates to wideband code division multiple access (WCDMA) for a communication system and more particularly to generation of primary and secondary synchronization codes for WCDMA.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in U.S. patent application Ser. No. 90/217,759, entitled Simplified Cell Search Scheme for First and Second Stage, filed Dec. 21, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within the cell or within range. The frames may propagate in a discontinuous transmission (DTX) mode within the cell. For voice traffic, transmission of user data occurs when the user speaks, but no data symbol transmission occurs when the user is silent. Similarly for packet data, the user data may be transmitted only when packets are ready to be sent. The frames include pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N). This number of chips in the symbol is the spreading factor.

A WCDMA base station must broadcast primary (PSC) and secondary (SSC) synchronization codes to properly establish communications with a mobile receiver. The PSC identifies the source as a base station within the cell. The SSC further identifies a group of synchronization codes that are selectively assigned to base stations that may transmit within the cell. Referring now to FIG. 1, there is a simplified block diagram of a circuit of the prior art for generating primary and secondary search codes. These search codes modulate or spread the transmitted signal so that a mobile receiver may identify it. Circuits 102 and 110 each produce a 256 cycle Hadamard sequence at leads 103 and 111, respectively. Either a true or a complement of a 16-cycle pseudorandom noise (PN) sequence, however, selectively modulates both sequences. This 16-cycle PN sequence is preferably a binary Lindner sequence given by $Z=\{1,1,-1,-1,-1,-1,1,-1,1,1,1,-1,1,1,1,-1,1\}$. Each element of the Lindner sequence is further designated $z_1-z_{16}$, respectively. Circuit 108 generates a 256-cycle code at lead 109 as a product of the Lindner sequence and each element of the sequence. The resulting PN sequence at lead 109, therefore, has the form $\{Z,Z,-Z,-Z,-Z,-Z,Z,-Z,Z,Z,Z,-Z,Z,Z,Z,-Z,Z\}$. Exclusive-OR circuit 112 modulates the Hadamard sequence on lead 111 with the PN sequence on lead 109, thereby producing a PSC on lead 114. Likewise, exclusive-OR circuit 104 modulates the Hadamard sequence on lead 103 with the PN sequence on lead 109, thereby producing an SSC on lead 106.

A WCDMA mobile communication system must initially acquire a signal from a remote base station to establish communications within a cell. This initial acquisition, however, is complicated by the presence of multiple unrelated signals from the base station that are intended for other mobile systems within the cell as well as signals from other base stations. The base station continually transmits a special signal at 16 KSPS on a perch channel, much like a beacon, to facilitate this initial acquisition. The perch channel format includes a frame with sixteen time slots, each having a duration of 0.625 milliseconds. Each time slot includes four common pilot symbols, four transport channel data symbols and two search code symbols. These search code symbols include the PSC and SSC symbols transmitted in parallel. These search code symbols are not modulated by the long code, so a mobile receiver need not decode these signals with a Viterbi decoder to properly identify the base station. Proper identification of the PSC and SSC by the mobile receiver, therefore, limits the final search to one of sixteen groups of thirty-two comma free codes each that specifically identify a base station within the cell to a mobile unit.

Referring to FIG. 2, there is a circuit of the prior art for detecting the PSC and SSC generated by the circuit of FIG. 1. The circuit receives the PSC symbol from the transmitter as an input signal IN on lead 200. The signal is periodically sampled in response to a clock signal by serial register 221 at an oversampling rate n. Serial register 221, therefore, has 15*n stages for storing each successive sample of the input signal IN. Serial register 221 has 16 (N) taps 242–246 that produce 16 respective parallel tap signals. A logic circuit including 16 XOR circuits (230, 232, 234) receives the respective tap signals as well as 16 respective PN signals to produce 16 output signals (231, 233, 235). This PN sequence matches the transmitted sequence from circuit 108 and is preferably a Lindner sequence. Adder circuit 248 receives the 16 output signals and adds them to produce a sequence of output signals at terminal 250 corresponding to the oversampling rate n.

A 16-symbol accumulator circuit 290 receives the sequence of output signals on lead 250. The accumulator circuit 290 periodically samples the sequence on lead 250 in serial register 291 in response to the clock signal at the oversampling rate n. Serial register 291, therefore, has 240*n stages for storing each successive sample. Serial register 291 has 16 taps 250–284 that produce 16 respective parallel tap signals. Inverters 285 invert tap signals corresponding to negative elements of the Lindner sequence. Adder circuit 286 receives the 16 output signals and adds them to produce a match signal MAT at output terminal 288 in response to an appropriate PSC or SSC.

These circuits of the prior art require significant memory and processing power to generate and identify the PSC and SSC. Referring to FIG. 3, there is an improved circuit of the prior art that substantially reduces the required processing power of a mobile unit for generating a PN sequence for the reverse link. The circuit includes N stages for generating a length $L=2^N$ sequence. Each stage includes a respective delay circuit 302–306, an adder circuit 308–312, a subtracter circuit 314–318 and a multiplier circuit 320–324. Each delay circuit further includes a respective number of memory elements for storing the PN sequence in response to a clock signal. An exemplary length 256 circuit, therefore, includes eight delay circuits with corresponding delays $D_1$–$D_N$ of 1, 2, 4, 8, 16, 32, 64 and 128, respectively. The circuit produces Golay complementary sequences Rra(k) and Rrb(k) in parallel at output terminals 326 and 328. The circuit requires $2\log_2(256)$ or 16 complex add operations for each sequence output sample. By way of comparison, this is approximately half the number of complex add operations required by the circuit of FIG. 2.

Several problems with the circuit of FIG. 3 render this solution less than ideal. The circuit still utilizes complex multiply operations. Furthermore, the circuit requires extensive memory to implement the delay circuits 302–306. For example, if input sequence r(k) is N bits wide, then each successive add operation increases the sequence width by one bit resulting in a sequence width of N+8 bits at output terminals 326 and 328. This increased width together with an increasing delay requires N+2(N+1)+4(N+2)+ . . . +128 (N+7) or 255N+1538 delay memory elements. This requires extensive layout area and increases power consumption. Both considerations are especially disadvantageous for mobile communications systems.

SUMMARY OF THE INVENTION

These problems are resolved by a circuit for processing binary sequences with a plurality of stages coupled to provide plural signal paths. Each stage includes respective signal paths for a first and a second data sequence. Each stage further includes a respective delay circuit having a different delay from said respective delay circuit of each other stage of the plurality of stages. A stage having a greatest delay precedes other stages in the plurality of stages of at least one of the plural signal paths.

The present invention reduces circuit complexity of PSC and SSC generation. Memory, processing power and layout area are further reduced.

BRIEF DESCRIPTION OF THE DRAWINGS

A more complete understanding of the invention may be gained by reading the subsequent detailed description with reference to the drawings wherein:

FIG. 1 is a simplified block diagram of a circuit of the prior art for generating primary and secondary synchronization codes;

FIG. 2 is a block diagram of a circuit of the prior art for detecting the primary synchronization code of FIG. 1;

FIGS. 7A and 7B are the SSC pattern for sequence generator 602 of FIG. 6;

FIG. 9C is a tabulated comparison of aperiodic cross correlation ((SSC+PSC) to PSC) of the hierarchical and Golay PN sequence generators for comma free codes 1–32;

FIG. 10A is a diagram of processing operations of a memory delay embodiment of the hierarchical PN sequence generator;

FIG. 10B is a diagram of processing operations of a memory delay embodiment of the Golay PN sequence generator;

FIG. 10C is a tabulated comparison of processing operations of memory delay embodiments of the hierarchical PN sequence generator and the Golay PN sequence generator;

FIG. 11C is a tabulated comparison of register delay embodiments of the hierarchical PN sequence generator and the Golay PN sequence generator;

FIGS. 12A–12C are combined embodiments of the Golay PN correlator circuit of the present invention;

FIGS. 13A–13D are simplified embodiments of the Golay PN sequence generator of the present invention;

DETAILED DESCRIPTION OF THE PREFERRED EMBODIMENTS

Figure 3:
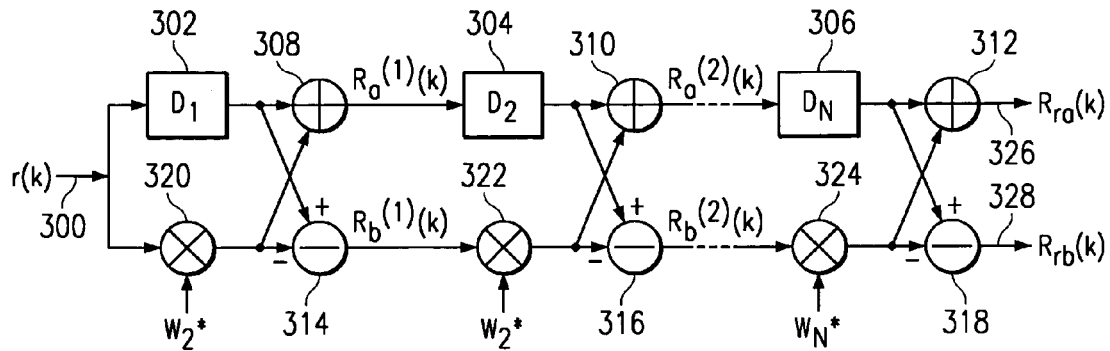
FIG. 3 is a block diagram of a Golay sequence circuit of the prior art.
Figure 4:
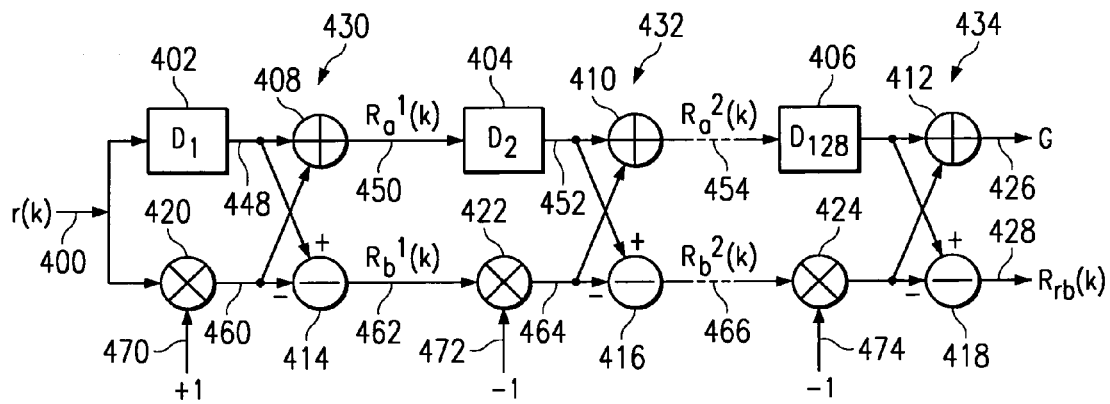
FIG. 4 is a block diagram of an improved Golay sequence circuit according to a first embodiment of the present invention.

Referring now to FIG. 4, there is a block diagram of an improved Golay sequence circuit according to a first embodiment of the present invention. The Golay sequence circuit may advantageously be used for either Golay sequence generation at a base station or Golay sequence matching or correlation at a mobile receiver. The Golay sequence circuit has eight stages 430–434 for producing a length $256=2^8$ sequence. A first stage 430 of the circuit receives a complex N-bit wide sequence r(k) on lead 400. This input sequence is the Krondecker delta function δ(k) for Golay sequence generation at a base station having a value of one for k=0 and zero for other time iterations of k. Since the Golay sequence circuit is linear, the output sequence is the circuit response to the Krondecker delta function δ(k). Equations [1a] and [1b] give the general form of this Golay complementary sequence, where $W_n^*$ is a complex weighting matrix, k is a time iteration and n is a stage index number.

$$R_a^n(k) = R_a^{n-1}(k - D_{2^{n-1}}) + W_n^* R_b^{n-1}(k) \quad [1a]$$

$$R_a^n(k) = R_a^{n-1}(k - D_{2^{n-1}}) - W_n^* R_b^{n-1}(k) \quad [1b]$$

The complex weighting matrix $W_n^*$ has a value {1,-1, 1,-1,1,-1,1,-1} for respective stages 1–8 of the embodiment of FIG. 4. An advantage of the present invention, therefore, is that circuits 420–422 need not perform a complex multiply. Rather, they are selectively complemented in response to the respective weighting element. This simplification reduces processing complexity by eliminating a complex multiply operation at each stage. Thus, equations [2a] and [2b] give the Golay complementary sequence at the output terminals 450 and 462 of the first stage 430, respectively. Equations [3a] and [3b] give the Golay complementary sequence at the output terminals 454 and 466 of the second stage 432, respectively.

$$R_a^1(k) = R_a^0(k - D_1) + R_b^0(k) \quad [2a]$$

$$R_b^1(k) = R_a^0(k - D_1) - R_b^0(k) \quad [2b]$$

$$R_a^2(k) = R_a^1(k - D_2) + R_b^1(k) \quad [3a]$$

$$R_b^2(k) = R_a^1(k - D_2) - R_b^1(k) \quad [3b]$$

Figure 5:
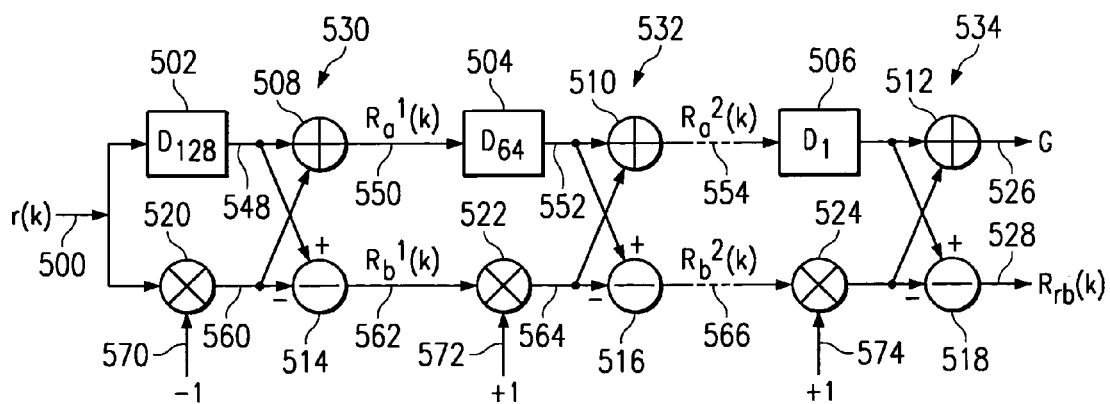
FIG. 5 is a block diagram of an improved Golay sequence circuit according to a second embodiment of the present invention.

Each increasing delay stage yields a total delay matrix $D_n$ having a value {1,2,4,8,16,32,64,128}. The output sequence G at lead 426 in response to the Krondecker delta function δ(k) at lead 400, weighting matrix $W_n^*$ and delay values $D_n$ is given in order from left to right and from top to bottom by equation [4].

sequence circuit also produces the sequence G of equation [4] at terminal 526. A significant advantage of this embodiment of the circuit, however, arises from the reversed values of the delay matrix $D_n$. This is due to the fact that the delay elements of each delay stage are preferably individual memory elements that are accessed in synchronization with a clock signal. Each memory element, therefore, corresponds to one clock cycle of delay. For example, if input sequence r(k) is N bits wide, then delay stage 502 requires N*128 memory elements. Adder circuit 508 adds an N-bit delayed data sequence on lead 548 to an N-bit complementary data sequence on lead 560, thereby increasing the width of the data sequence on lead 550 by one bit. Thus, the total memory required to implement delay matrices for the circuits of FIG. 4 and FIG. 5 is given by equations [5] and [6], respectively.

$$M = N + 2(N+1) + 4(N+2) + \ldots + 128(N+7) = 255N + 1538 \quad [5]$$

$$M = 128N + 64(N+1) + 32(N+2) + \ldots + (N+7) = 255N + 247 \quad [6]$$

For a 6-bit wide sequence, the circuit of FIG. 4 requires 3068 memory elements for all eight delay stages. By way of comparison, the circuit of FIG. 5 requires only 1777 memory elements for the same eight delay stages. Thus, a total savings of 1291 memory elements or 42% savings is realized by the circuit of FIG. 5. This is highly advantageous in reducing layout or die area for both memory elements and associated interconnect. Moreover, the reduced memory elements further reduce power consumption.

Either embodiment of FIG. 4 or FIG. 5 may be advantageously used for Golay sequence matching or correlation at a mobile receiver. The complex N-bit wide input sequence r(k) at the mobile receiver is the Golay output sequence G produced by the base station. The resulting output sequence at the mobile receiver then has a maximum value when the Golay sequence matching circuit matches the input sequence $$G = \begin{Bmatrix} 1 & 1 & -1 & 1 & 1 & 1 & 1 & -1 & -1 & -1 & 1 & -1 & 1 & 1 & 1 & -1 \\ 1 & 1 & -1 & 1 & 1 & 1 & 1 & -1 & 1 & 1 & -1 & 1 & -1 & -1 & -1 & 1 \\ -1 & -1 & 1 & -1 & -1 & -1 & -1 & 1 & 1 & 1 & -1 & 1 & -1 & -1 & -1 & 1 \\ 1 & 1 & -1 & 1 & 1 & 1 & 1 & -1 & 1 & 1 & -1 & 1 & -1 & -1 & -1 & 1 \\ 1 & 1 & -1 & 1 & 1 & 1 & 1 & -1 & -1 & -1 & 1 & -1 & 1 & 1 & 1 & -1 \\ 1 & 1 & -1 & 1 & 1 & 1 & 1 & -1 & 1 & 1 & -1 & 1 & -1 & -1 & -1 & 1 \\ 1 & 1 & -1 & 1 & 1 & 1 & 1 & -1 & -1 & -1 & 1 & -1 & 1 & 1 & 1 & -1 \\ -1 & -1 & 1 & -1 & -1 & -1 & -1 & 1 & -1 & -1 & 1 & -1 & 1 & 1 & 1 & -1 \\ -1 & -1 & 1 & -1 & -1 & -1 & -1 & 1 & 1 & 1 & -1 & 1 & -1 & -1 & -1 & 1 \\ -1 & -1 & 1 & -1 & -1 & -1 & -1 & 1 & -1 & -1 & 1 & -1 & 1 & 1 & 1 & -1 \\ 1 & 1 & -1 & 1 & 1 & 1 & 1 & -1 & -1 & -1 & 1 & -1 & 1 & 1 & 1 & -1 \\ -1 & -1 & 1 & -1 & -1 & -1 & -1 & 1 & -1 & -1 & 1 & -1 & 1 & 1 & 1 & -1 \\ 1 & 1 & -1 & 1 & 1 & 1 & 1 & -1 & -1 & -1 & 1 & -1 & 1 & 1 & 1 & -1 \\ 1 & 1 & -1 & 1 & 1 & 1 & -1 & 1 & 1 & -1 & 1 & -1 & -1 & -1 & 1 \\ 1 & 1 & -1 & 1 & 1 & 1 & 1 & -1 & -1 & -1 & 1 & -1 & 1 & 1 & 1 & -1 \\ -1 & -1 & 1 & -1 & -1 & -1 & -1 & 1 & -1 & -1 & 1 & -1 & 1 & 1 & 1 & -1 \end{Bmatrix} \quad [4]$$

Turning now to FIG. 5, there is a block diagram of an alternative embodiment of the Golay sequence generator. This embodiment of the circuit differs from the circuit of FIG. 4 in that weighting matrix $W_n^*$ has a value {-1,1,-, 1,-1,1,-1,1} and delay matrix $D_n$ has a reversed delay value of {128,64,32,16,8,4,2,1}. This embodiment of the Golay and minimum values elsewhere. These minimum values will be discussed in detail with respect to FIG. 8.

Figure 6:
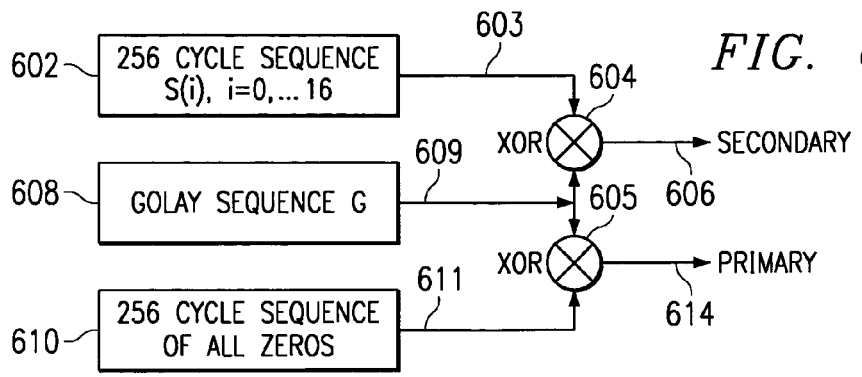
FIG. 6 is a simplified block diagram of a circuit of the present invention for generating primary and secondary synchronization codes.

Turning now to FIG. 6, there is a simplified block diagram of a circuit for producing primary and secondary synchronization codes according to the present invention. Golay sequence circuit 608 may be either of the previously described embodiments of Golay sequence circuits of FIG. 4 or FIG. 5. The Golay sequence circuit 608 produces the Golay sequence G on lead 609. Circuit 610 produces a 256 cycle all zero sequence on lead 611. Exclusive OR circuit 605 receives these sequences as input signals and produces the PSC on lead 614. This PSC is then transmitted on a broadcast channel to initially identify a respective base station. The Golay sequence circuit 602 produces Golay sequence on lead 603. The exclusive OR circuit 604 receives the Golay sequence on lead 609 and the Golay sequence on lead 603 as input signals, respectively, and produces the SSC on lead 606. The Golay sequence on lead 603, therefore, must be orthogonal with respect to the Golay sequence on lead 609. Moreover, the Golay sequence on lead 603 must include seventeen comma free code words or sequences S(i) corresponding to sixteen possible groups of thirty-two code sequences. These comma free code words are identified by mobile units within the respective base station cell, thereby limiting code matching searches to the thirty-two code sequences.

Figures 7A, 7B:
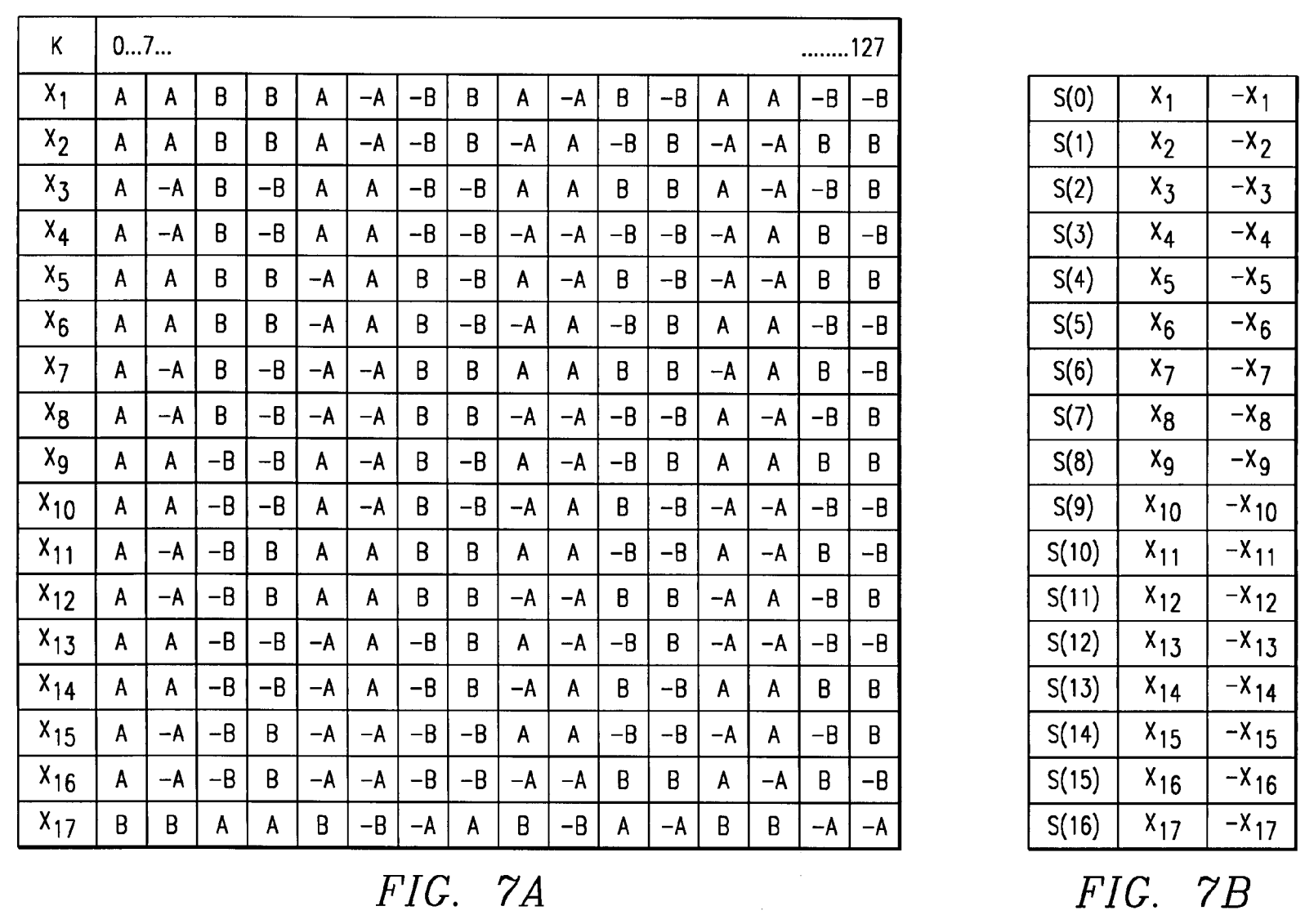

Referring now to FIG. 7, the pattern of the orthogonal sequence on lead 603 will be explained in detail. The pattern of FIG. 7A includes complementary eight-bit Golay sequences A={1,1,-1,1,1,1,1,-1} and B={1,1,-1,1,-1,-1,1} that may be produced by the circuits of FIG. 4 or FIG. 5 or stored as factors. Sixteen of the eight-bit factors A and B are arranged in true or complement form corresponding to each of rows $X_1$–$X_{17}$. Each of the seventeen rows, therefore, includes a different orthogonal 128-bit sequence. The sequence of each row is then concatenated with its complement (FIG. 7B) to produce a respective 256-bit sequence. These 256-bit sequences S(0)–S(16) are applied to lead 603 as previously described to produce the SSC.

Figure 8A:
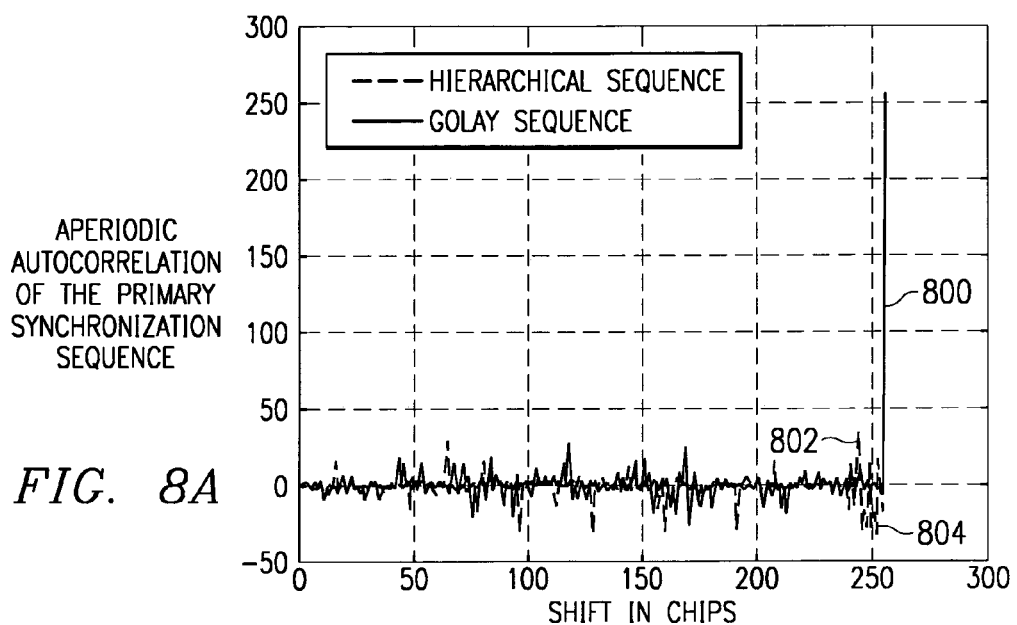
FIGS. 8A and 8B is a comparison of the hierarchical PN sequence generator (108 of FIG. 1) of the prior to the Golay PN sequence generator art (608 of FIG. 6) of the present invention.

A significant advantage of the present invention is an improved likelihood of correct identification of the PSC and SSC at a mobile receiver. The plot of FIG. 8A compares an aperiodic autocorrelation of the PSC of the hierarchical PSC circuit of FIG. 2 to the Golay sequence circuit of FIG. 5. The aperiodic shift includes a range of 256 chips along the horizontal axis. A perfect match between each respective base and mobile receiver produces a maximum output signal 800 at chip 256. Although an ideal response of zero is desirable for other shift values, it is not a practical response in view of existing design constraints. The dashed curve represents an autocorrelation or match signal between the hierarchical base (FIG. 1) and mobile receiver (FIG. 2) of the prior art. The solid curve represents a corresponding autocorrelation between the Golay sequence generator (FIG. 6) and Golay correlator (FIG. 5) of the present invention. The hierarchical match circuit (dashed line) has greater positive 802 and negative 804 side lobes than the Golay sequence match circuit (solid line) of the present invention. These greater side lobes indicate a greater chance of incorrect identification of a base station PSC in a low signal-to-noise environment.

Figure 8B:
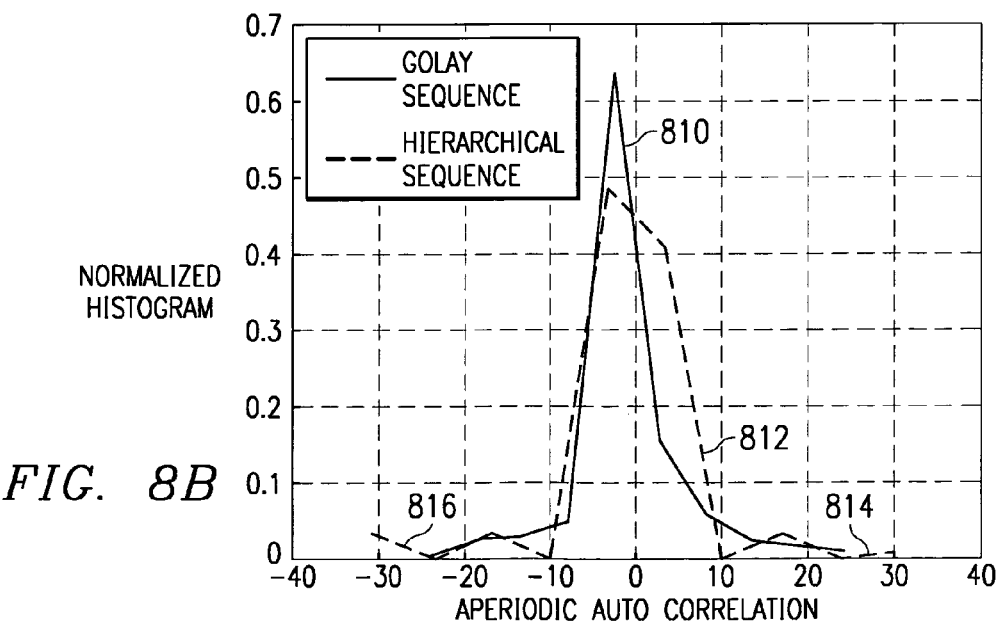

The plot of FIG. 8B shows a normalized histogram comparing the response of the hierarchical PSC circuit of FIG. 2 to the response of the Golay correlator circuit of FIG. 5. The histogram plots the number of side lobes at corresponding positive and negative excursions. The Golay sequence curve 810 has a narrower base than the hierarchical sequence curve 812. This indicates that more Golay sequence side lobes have smaller positive and negative excursions than the hierarchical sequence side lobes. Moreover, the hierarchical sequence curve shows a significantly greater number of side lobes having positive 814 and negative 816 excursions of a magnitude greater than 30 compared to the Golay sequence curve. This relative difference is significant, because these larger positive and negative excursions are most likely to incorrectly signal a match of the PSC between the base station and the mobile receiver in a low signal-to-noise environment.

Figure 9A:
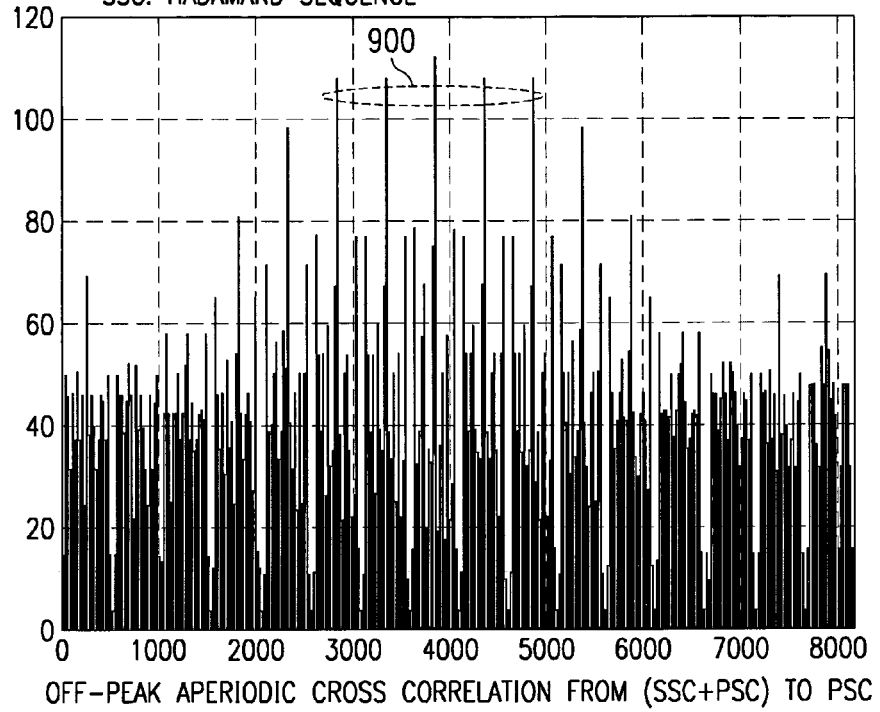
FIG. 9A is an aperiodic cross correlation ((SSC+PSC) to PSC) of the hierarchical PN sequence generator for comma free code 5.

Turning now to FIG. 9A, there is a plot of an off-peak aperiodic correlation of the Hadamard SSC and hierarchical PSC (FIG. 1) to the hierarchical PSC (FIG. 2) during first stage acquisition or PSC identification for comma free code 5. The Hadamard SSC and the hierarchical PSC are transmitted in parallel as respective 256-chip modulated symbols. Each time slot includes one PSC symbol and one SSC symbol. Thus, there are sixteen PSC and sixteen SSC symbols in each frame. A mobile receiver must detect this PSC in the presence of interference from the parallel SSC. This interference from the SSC is particularly significant, since neither the SSC nor the PSC are modulated by the long code. Without this long code modulation, the SSC interference is less Gaussian, having abrupt peaks that may provide a false match. This off-peak aperiodic correlation, therefore, is a significant indication of the likelihood that the mobile receiver will correctly identify the PSC in a low signal-to-noise environment. The plot is the result of a convolution between the 256-cycle parallel PSC and SSC transmitted by the base station and the 256-cycle hierarchical matched filter (FIG. 2) at the mobile receiver. This convolution provides 511 samples for each of sixteen SSC 256-cycle comma free codes. These 511 samples are RMS averaged over eight time slots to provide sixteen groups of 511 samples. Each sample within each of eight time slots is squared, added, averaged and a square root of the sum is plotted. A maximum value of 256 indicating a match is not plotted. For example, the first group is an average of 511 samples for time slots 1–8. The second group is an average of samples for time slots 2–9. The remaining groups are for time slots 3–10, 4–11, 5–12, 6–13, 7–14, 8–15, 9–16, 10–1, 11–2, 12–3, 13–4, 14–5, 15–6 and 16–7.

Figure 9B:
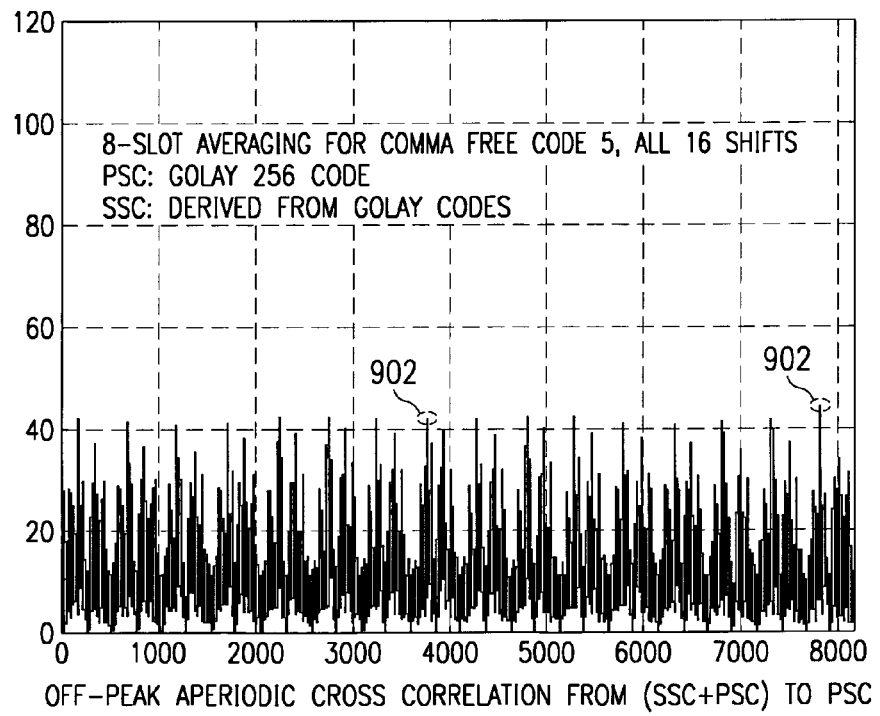
FIG. 9B is an aperiodic cross correlation ((SSC+PSC) to PSC) of the Golay PN sequence generator for comma free code 5.

Groups representing time slots 6–13 through 10–1 each include maximum off-peak aperiodic correlation values 900 between 100 and 120. This is more than 40% of the maximum value expected for a proper PSC match, and may produce a false PSC identification in a low signal-to-noise environment. The plot of FIG. 9B is an aperiodic cross correlation of transmitted Golay sequence PSC and SSC to a Golay PSC correlator circuit (FIG. 5) for comma free code 5. The plot is generated in the same manner described for FIG. 9A. By way of comparison, the maximum off-peak aperiodic correlation values 902 are between 40 and 50. This is less than half that of the maximum off-peak aperiodic correlation values 900 of FIG. 9A of the prior art. Thus, the present invention substantially reduces the likelihood of false identification of a PSC in a low signal-to-noise environment.

Referring to FIG. 9C, there are off-peak aperiodic correlation values as previously described normalized to a maximum value of 256 for all thirty-two comma free codes. The Hadamard SSC and hierarchical PSC (FIG. 1) correlated to the hierarchical PSC matched filter (FIG. 2) yields the column of values a. By way of comparison, the Golay SSC and Golay PSC (FIG. 6) correlated to the Golay PSC correlator (FIG. 5) yields the column of values β. An expected gain for each comma free code is shown in the right column of the corresponding row as given by equation [7].

$$\text{Gain(dB)} = 20\log_{10}((256-\beta)/(256-\alpha)) \qquad [7]$$

This gain is a ratio of a difference between a normalized maximum of 256 and side lobe maximum excursions for each comma free code of the Golay sequence of the present invention to the Hadamard and hierarchical sequence of the prior art. The gain for the thirty-two comma free codes has a range from 1.0 dB for comma free code 22 to 3.4 dB for comma free code 5. This gain together with the reduced complexity and power are highly advantageous features of the present invention.

Advantages of reduced complexity of the present invention are readily apparent from FIG. 10. Referring to FIG. 10A, there is a simplified diagram of processing operations of a hierarchical PN matched filter circuit of the prior art. This matched filter circuit corresponds to the circuit of FIG. 2. Therein, a first memory delay circuit 221 and a second memory delay circuit 291 each require a memory write operation at respective input terminals for each correlation output sample. Each delay circuit has 15 taps that are sampled by a memory read operation at each output sample. Finally, adders 248 and 286 (FIG. 2) must each perform 15 add operations for each correlation output sample. By way of comparison, FIG. 10B shows a simplified diagram of processing operations of the Golay sequence circuit of the present invention. This matched filter circuit corresponds to the circuit of FIG. 5. Therein, the eight memory delay circuits 502–506 require eight memory write operations for each output sample. The eight memory delay circuits further require eight memory read operations for each output sample. The add and subtract circuits for each respective stage, for example add circuit 508 and subtract circuit 514 for the first stage 530 (FIG. 5), require two add operations for each stage except the last stage 534. Only output sequence G at lead 526 is used, so subtract circuit 518 may be eliminated. Thus, only 15 add operations are required for each output sample.

These comparative results are summarized in the table of FIG. 10C. The hierarchical sequence circuit of the prior art is listed in the left column, and the Golay sequence circuit of the present invention is listed in the right column. Power consumption for a read operation is estimated at five times 5× the power required for an add operation x. Power consumption for a write operation is estimated at ten times 10× the power required for the add operation. The power consumption of the hierarchical circuit, therefore, is 200× for each output sample. Alternatively, the power consumption of the Golay sequence circuit is 135× for each output sample. Thus, the Golay sequence circuit provides a 35% power reduction over the hierarchical circuit. Furthermore, the memory delay elements required for the Golay sequence circuit are comparably reduced. For example, the Golay sequence circuit reduces required memory by 32%, 29% and 24% over the hierarchical circuit for 5-bit, 6-bit and 8-bit input sequence word widths, respectively.

Figure 11A:
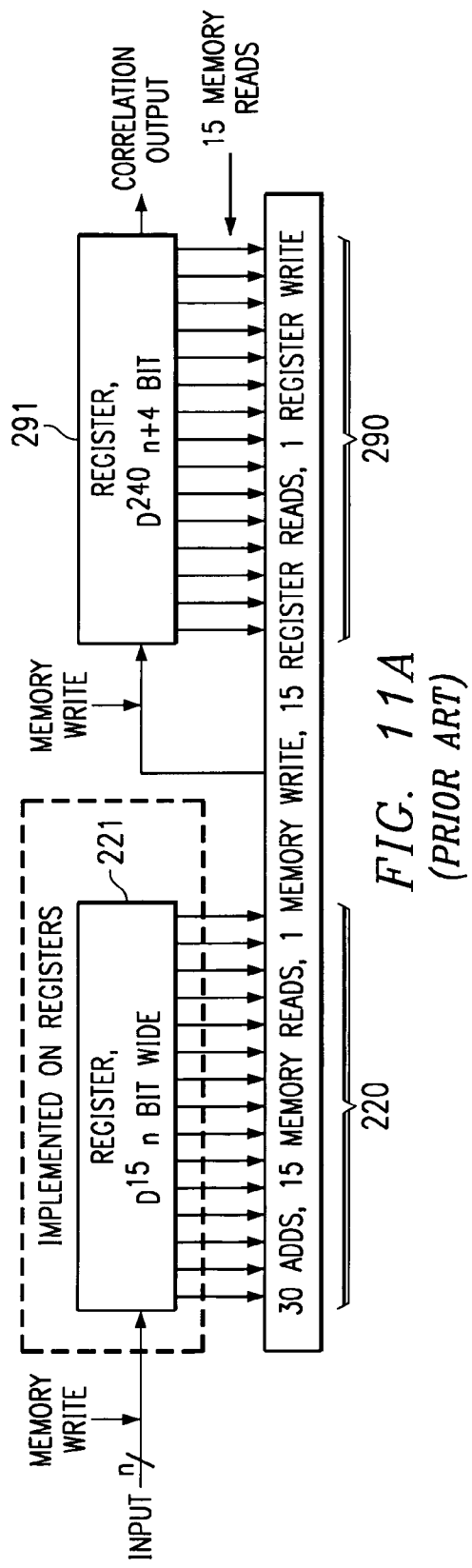
FIG. 11A is a diagram of processor operations of a register delay embodiment of the hierarchical PN sequence generator.
Figure 11B:
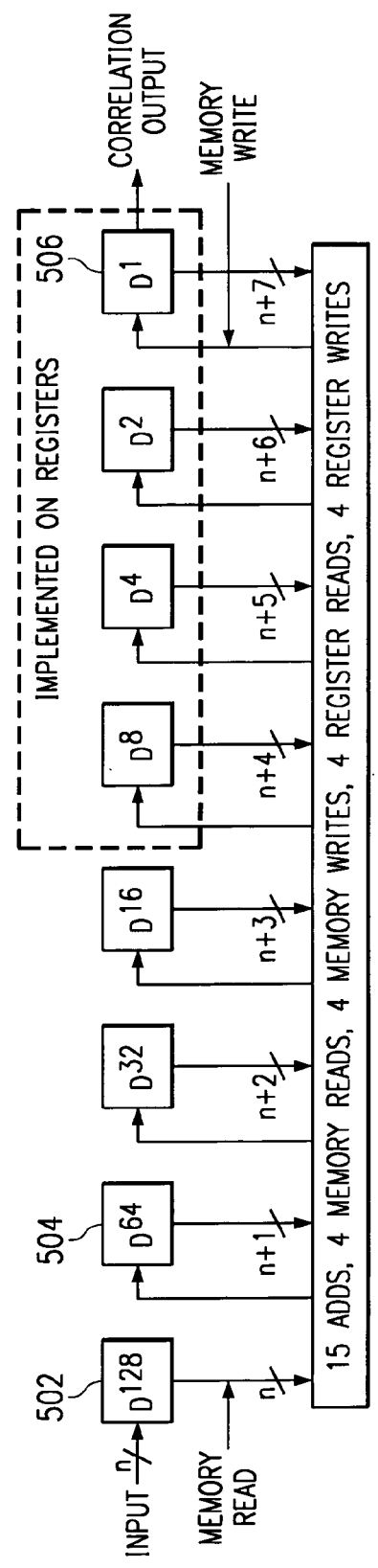
FIG. 11B is a diagram of processor operations of a register delay embodiment of the Golay PN sequence generator.

Referring now to FIG. 11, there are exemplary partial register embodiments of the prior art and the present invention for the purpose of comparison. The hierarchical PN sequence generator to FIG. 11A includes a register implementation in of memory delay circuit 221. This reduces the total memory access to fifteen memory read operations and one memory write operation for each output sample. Register operations, however, are increased to fifteen register read operations and one register write operation for each output sample. A comparable partial register embodiment of the Golay sequence circuit of FIG. 11B includes register delay elements for the last four delay circuits. This reduces memory access to four memory read operations and four memory write operations for each output sample. Correspondingly, four register read operations and four register write operations are required for each output sample. The circuits of FIG. 11A and FIG. 11B require the same number of add operations as previously described with respect to FIG. 10. Comparative results summarized in the table of FIG. 11C show an advantage in power consumption for the Golay and hierarchical circuits for partial register embodiments. Memory access operations are estimated as previously described with respect to FIG. 10. Register read and write operations, however, are estimated at the same power consumption as an add operation.

According to these estimates the hierarchical sequence requires 131× power consumption compared to 83× power consumption for the Golay sequence circuit of the present invention. Thus, the Golay sequence circuit provides a 37% power improvement over the hierarchical circuit. Moreover, the Golay sequence circuit maintains an advantage of required memory of 37%, 33% and 27% over the hierarchical circuit for 5-bit, 6-bit and 8-bit input sequence word widths, respectively. Although the invention has been described in detail with reference to its preferred embodiment, it is to be understood that this description is by way of example only and is not to be construed in a limiting sense. For example, the matched filter circuit of FIG. 12A is an alternative embodiment of the Golay correlator circuit combined with a second section of the matched filter circuit of FIG. 2. The Golay correlator circuit 1202 may be either of the previously described circuits of FIG. 4 and FIG. 5. The Golay correlator circuit replaces the first section 220 of the matched filter circuit of FIG. 2 to function as a chip accumulator. The output sequence at lead 1204 is applied to the input terminal of second section 290 of the matched filter circuit. The second section 290 functions as a symbol accumulator as previously described. In another alternative embodiment of FIG. 12B, the first section 220 of the matched filter circuit of FIG. 2 is combined with the Golay correlator circuit 1206. The Golay correlator circuit replaces the second section 290 of the matched filter circuit (FIG. 2) to act as a symbol accumulator as previously described. In yet another embodiment of FIG. 12C, the Golay correlator circuit is concatenated to form a two section matched filter circuit. The first section 1212 receives an input sequence at terminal 1200, and accumulates a sequence of chips. The accumulated chip output sequence on lead 1216 is applied to an input terminal of the second section Golay correlator circuit 1214. This second section accumulates symbols and produces a match signal on lead 1210.

Figure 13A:
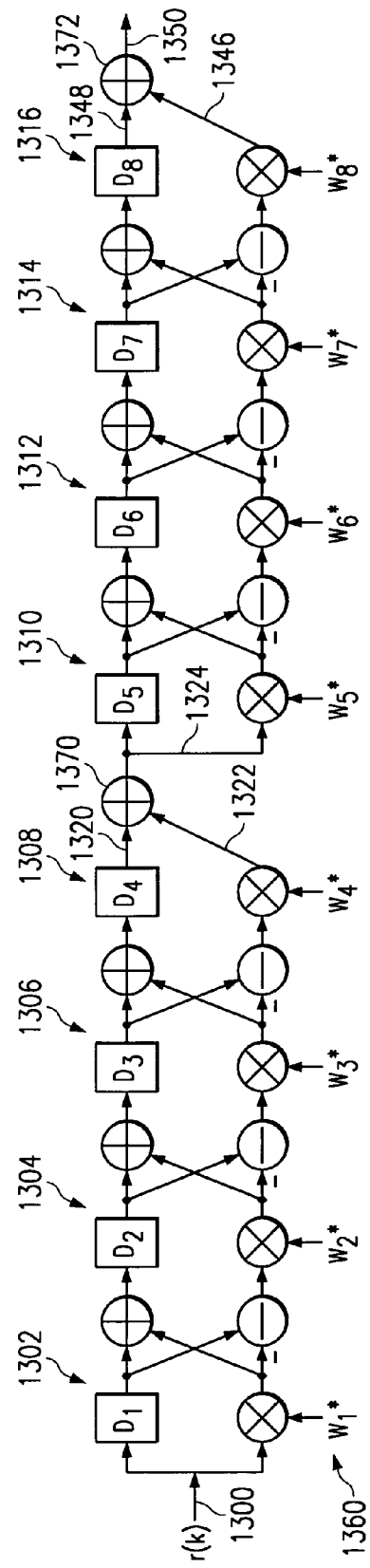

Referring now to FIG. 13A, there is a schematic diagram of an embodiment of a Golay sequence circuit configured as a two section matched filter circuit. The circuit includes eight stages 1302–1316. The delay matrix Dn values and weighting matrix values Wn are given in order from first stage 1302 through last stage 1316 by equations [8] and [9], respectively.

$$D_n=\{128,64,16,32,8,4,1,2\} \qquad [8]$$

$$W_n=\{1,-1,1,1,1,-1,1,1\} \qquad [9]$$

This embodiment of the Golay sequence circuit is similar to the previously described embodiment of FIG. 5 except that different and near optimal matrix parameters are selected for this circuit configuration by extensive simulation. These matrix parameters correspond to optimal maximum absolute aperiodic autocorrelation sidelobes (MAS) of the output signal at lead 1350. One output of each of stages 1308 and 1316 is eliminated or pruned from the circuit (FIG. 13A). Thus, the signals at lead 1320 and 1322 of stage 1308 are applied to adder circuit 1370, which produces an output signal on lead 1324. This output signal on lead 1324 is applied to both complementary input terminals of stage 1310. A similar pruning of stage 1316 produces a single output sequence at lead 1350. This pruning advantageously eliminates one subtract circuit and a corresponding subtract operation from each of stages 1308 and 1316, thereby reducing circuit area and power consumption.

Figure 13B:
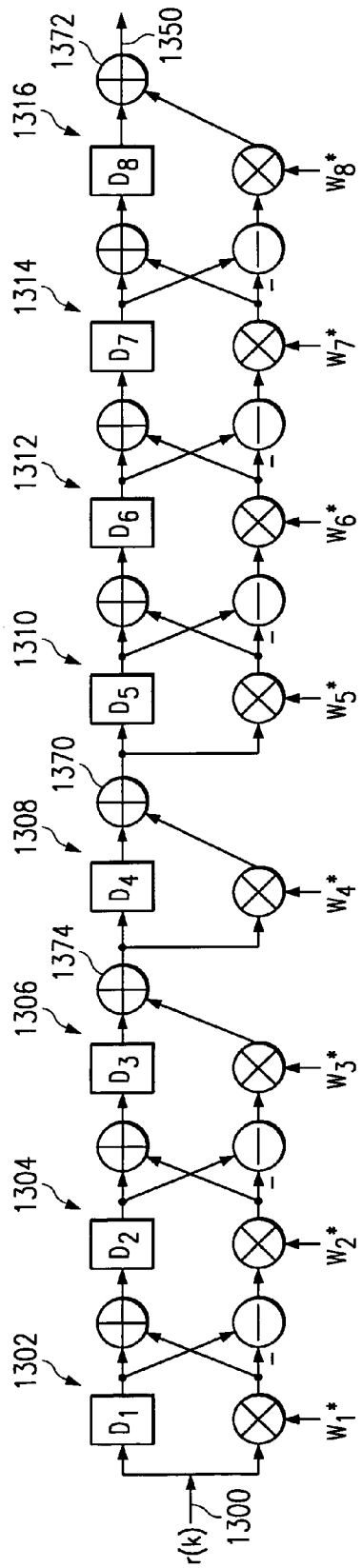

Turning now to FIG. 13B, there is a schematic diagram of an embodiment of a Golay sequence circuit configured as a three-section circuit. The circuit includes eight stages 1302–1316 with matrix values $D_n=\{128,16,64,32,8,4,1,2\}$ and $W_n=\{-1,-1,1,1,1,-1,-1,-1\}$. The three sections include stages 1302–1306, 1308 and 1310–1316, respectively. This embodiment advantageously eliminates or prunes one output signal from stage 1306 in addition to stages 1308 and 1316. Further pruning produces the five-section circuit of FIG. 13C, having the matrix values of FIG. 13B. The four sections include stages 1302–1306, 1308, 1310–1312, 1314 and 1316, respectively. This embodiment advantageously prunes an additional output signals from stages 1312 and 1314.

The circuit of FIG. 13D, is a schematic diagram of another embodiment of a Golay sequence circuit configured as a three-section circuit. The circuit includes eight stages 1302–1316 with matrix values $D_n=\{128,64,16,32,8,1,4,2\}$ and $W_n=\{-1,1,1,1,1,1,1,1\}$. The three sections include stages 1302–1308, 1310–1312 and 1314–1316, respectively. This embodiment advantageously eliminates or prunes output signals from stages 1308 and 1312 in addition to stage 1316. This embodiment advantageously improves performance with respect to the three-section circuit of FIG. 13B. A summary of performance criteria of various embodiments of the Golay sequence circuit is summarized in Table I.

TABLE I

|  | MAS err = 0 Hz | MAS err = 10 kHz | No. Adds per sample |
|---|---|---|---|
| FIG. 4 | 27 | 58 | 15 |
| FIG. 13A | 48 | 64 | 14 |
| FIG. 13B | 96 | 64 | 13 |
| FIG. 13C | 96 | 64 | 11 |
| FIG. 13D | 64 | 64 | 13 |

Table I shows the single-section Golay sequence circuit of FIG. 4 offers the lowest maximum absolute aperiodic autocorrelation sidelobes (MAS) of 27 when there is no frequency error. The MAS increases to 58 for a 10 kHz error between base station and mobile unit carrier frequencies. The two-section circuit of FIG. 13A has a higher MAS of 48 for no frequency error. Pruned circuits of FIG. 13B–FIG. 13C have a MAS of 96 for no frequency error. The pruned circuit of FIG. 13D, however, has an improved MAS of 64 with respect to the circuits of FIG. 13B and FIG. 13C for no frequency error. For a 10 kHz error, however, all pruned circuits have a MAS of 64. The significant advantages of pruning, therefore, are in circuit simplification and power reduction. For example, each pruning operation decreases the total number of add and subtract circuits and operations with respect to the circuit of FIG. 4. This is particularly advantageous for mobile receiver applications where complexity and power consumption are critical.

Figure 14A:
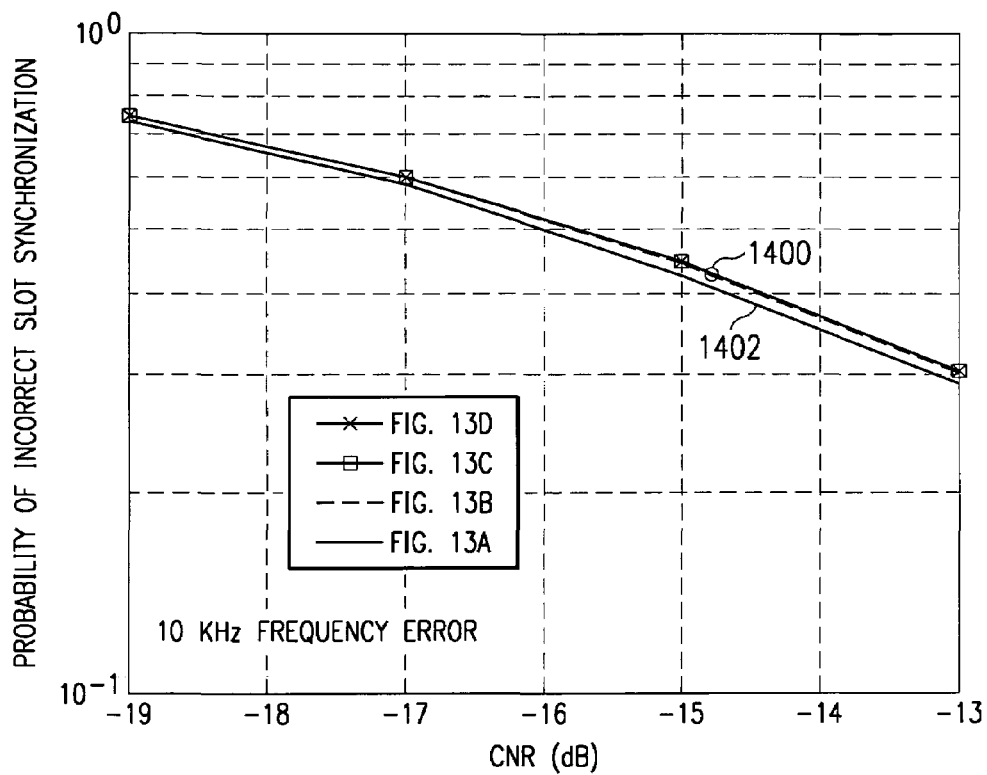
FIGS. 14A–14B are simulation plots of the probability of incorrect slot synchronization.
Figure 14B:
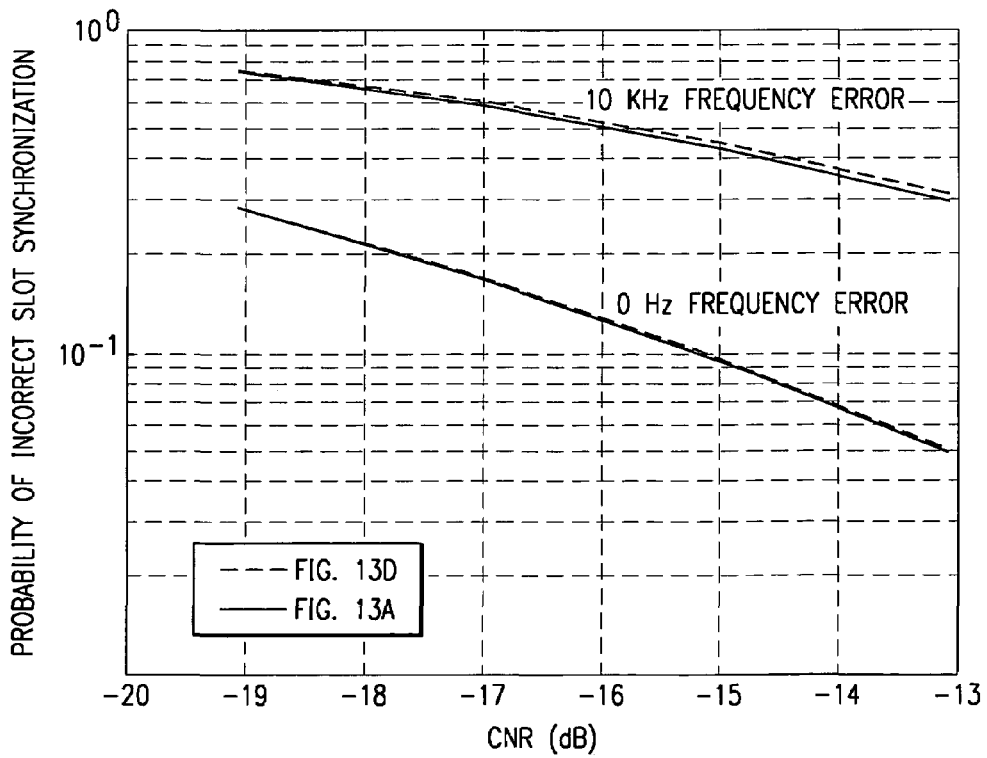
Figure 14C:
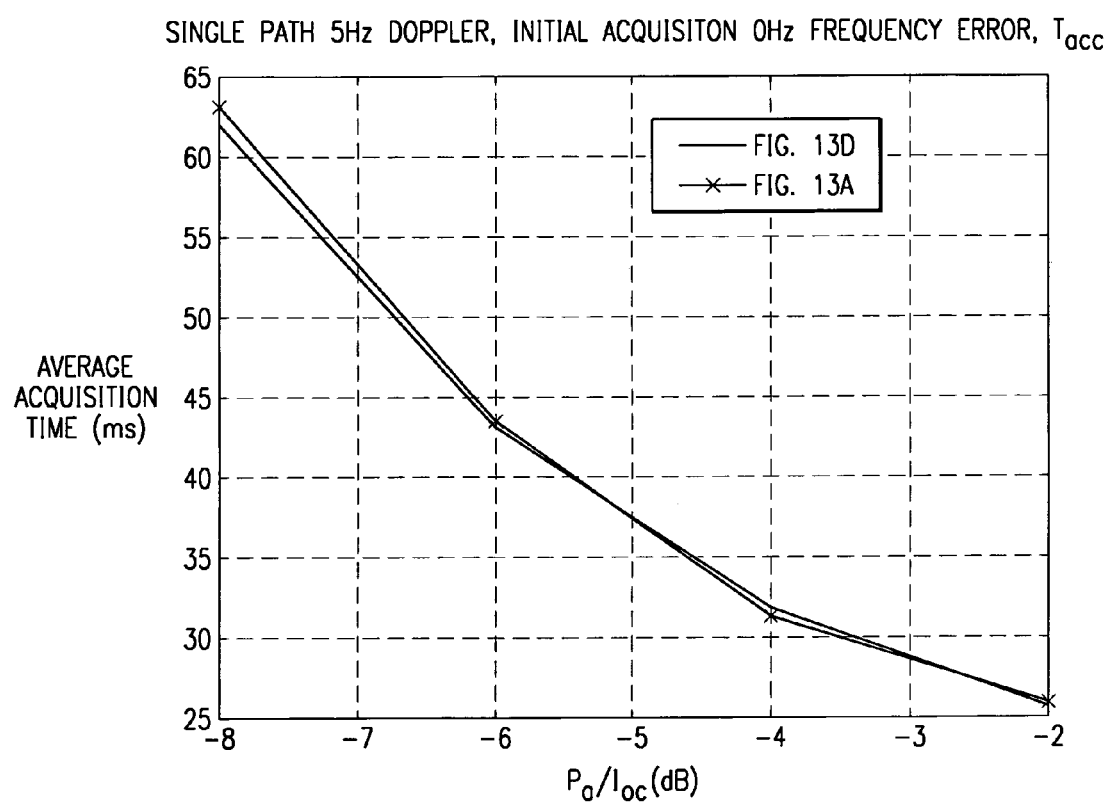
FIG. 14C is a simulation plot of average PSC acquisition time.

Referring to FIG. 14A, there is plot of a simulation of the probability of incorrect time slot synchronization as a function of the chip noise ratio (CNR). Curve 1402 of the embodiment of FIG. 13A shows a slightly lower probability of incorrect synchronization over the entire noise range for a frequency error of 10 kHz. Other embodiments of FIG. 13B through FIG. 13D show a comparable probability. The simulation plot of FIG. 14B compares the embodiments of FIG. 13A and FIG. 13D for no frequency error and 10 kHz frequency error. By way of comparison, both pruned circuits show a comparable probability of slot synchronization. The frequency error is a significantly greater factor in time slot synchronization. The simulation plot of FIG. 14C compares average PSC acquisition time as a function of signal power divided by interference power ($P_d/I_{oc}$) for the embodiments of FIG. 13A and FIG. 13D. Both have comparable acquisition times for single path reception at a 5 Hz Doppler rate.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A circuit for processing binary sequences, comprising a plurality of stages coupled to provide plural signal paths, each stage including respective signal paths for a first and a second data sequence, each stage further including a respective delay circuit having a different delay from said respective delay circuit of each other stage of the plurality of stages, wherein only one of said respective signal paths for the first and the second data sequence for said each stage includes said respective delay circuit and said respective delay circuit having a different delay from said respective delay circuit of each other stage includes having a delay that is one of twice and one-half a delay of another delay circuit and wherein the plurality of stages are arranged by monotonically decreasing delay for one of said respective signal paths for the first and the second data sequence.

2. A circuit for processing binary sequences, comprising a plurality of stages coupled to provide plural signal paths, each stage including respective signal paths for a first and a second data sequence, each stage further including a respective delay circuit having a different delay from said respective delay circuit of each other stage of the plurality of stages, wherein a stage having a greatest delay precedes other stages in the plurality of stases of at least one of the plural signal paths and connected to an output terminal of a serial circuit, the serial circuit, comprising:
   a plurality of delay circuits connected in series, a first of the delay circuits connected to an input terminal, each delay circuit having an equal delay;
   a plurality of logic circuits, each logic circuit having a first input terminal coupled to a respective delay circuit and having a second input terminal coupled to receive a respective data signal, the plurality of logic circuits producing a respective plurality of output signals; and
   an arithmetic circuit coupled to receive the respective plurality of output signals, the arithmetic circuit producing the binary sequences in response to the plurality of output signals.

3. A circuit as in claim 2, wherein the serial circuit is a matched filter circuit and the arithmetic circuit is an adder circuit.

4. A circuit for processing binary sequences, comprising a plurality of stages coupled to provide plural signal paths, each stage including respective signal paths for a first and a second data sequence, each stage further including a respective delay circuit having a different delay from said respective delay circuit of each other stage of the plurality of stages, wherein a stage having a greatest delay precedes other stages in the plurality of stages of at least one of the plural signal paths and connected to an input terminal of a serial circuit, the serial circuit, comprising:
- a plurality of delay circuits connected in series, a first of the delay circuits connected to the input terminal, each delay circuit having an equal delay;
- a plurality of logic circuits, each logic circuit having a first input terminal coupled to a respective delay circuit and having a second input terminal coupled to receive a respective data signal, the plurality of logic circuits producing a respective plurality of output signals; and
- an arithmetic circuit coupled to receive the respective plurality of output signals, the arithmetic circuit producing an output signal in response to the plurality of output signals.

5. A circuit as in claim 4, wherein the serial circuit is a matched filter circuit and the arithmetic circuit is an adder circuit.

6. A method of producing a synchronization code for a mobile receiver, comprising:
- a. producing a first data sequence;
- b. delaying the first data sequence by a first delay, thereby producing a first delayed data sequence;
- c. producing a third data sequence as a first combination of a second data sequence and the first delayed data sequence, wherein the second data sequence is one of the first data sequence and a complement of the first data sequence;
- d. producing a fourth data sequence as a second combination of the first delayed data sequence and the second data sequence; and
- e. repeating steps b through d, by incrementing each respective number of the data sequence, the delay and the delayed data sequence by two for a predetermined number of repetitions; and
- f. producing the synchronization code as one of at least one of an odd and even numbered said data sequence, wherein a repetition of said predetermined number of repetitions precedes all other repetitions of said predetermined number of repetitions which have shorter delays, wherein said delaying comprises a different delay corresponding to each respective repetition of said predetermined number of repetitions, wherein a repetition of said predetermined number of repetitions precedes all other repetitions of said predetermined number of repetitions which have shorter delays.

7. A method of producing a synchronization code for a mobile receiver, comprising:
- a. producing a first data sequence;
- b. delaying the first data sequence by a first delay, thereby producing a first delayed data sequence;
- c. producing a third data sequence as a first combination of a second data sequence and the first delayed data sequence, wherein the second data sequence is one of the first data sequence and a complement of the first data sequence;
- d. producing a fourth data sequence as a second combination of the first delayed data sequence and the second data sequence; and
- e. repeating steps b through d, by incrementing each respective number of the data sequence, the delay and the delayed data sequence by two for a predetermined number of repetitions; and
- f. producing the synchronization code as one of at least one of an odd and even numbered said data sequence, further comprising modulating the synchronization code with a different synchronization code, thereby producing one of a primary and secondary synchronization code.

8. A method of producing a synchronization code for a mobile receiver, comprising
- a. producing a first data sequence;
- b. delaying the first data sequence by a first delay, thereby producing a first delayed data sequence;
- c. producing a third data sequence as a first combination of a second data sequence and the first delayed data sequence, wherein the second data sequence is one of the first data sequence and a complement of the first data sequence;
- d. producing a fourth data sequence as a second combination of the first delayed data sequence and the second data sequence; and
- e. repeating steps b through d, by incrementing each respective number of the data sequence, the delay and the delayed data sequence by two for a predetermined number of repetitions; and
- f. producing the synchronization code as one of at least one of an odd and even numbered said data sequence, wherein said producing the synchronization code comprises adding said odd and even numbered data sequences having greatest respective numbers of a final repetition of said predetermined number of repetitions.

9. A plurality of circuits connected in series for processing an input comprising:
- a first circuit including a plurality of stages coupled to provide plural signal paths, each stage including respective signal paths for a first and a second data sequence, each stage further including a respective delay circuit having a different delay from said respective delay circuit of each other stage of the plurality of stages, at least one of the plurality of stages combining the first and second data sequence, thereby producing a first output sequence; and
- a second circuit including a plurality of stages, each stage further including a respective delay circuit, the second circuit arranged to provide plural signal paths for the first output sequence.

10. A plurality of circuits as in claim 9, wherein the first circuit further comprises a first input terminal and a first output terminal, the first input terminal coupled to receive the input sequence, the first output terminal coupled to receive the first output sequence and wherein the second circuit further comprises a second input terminal and a second output terminal, the second input terminal coupled to the first output terminal.

11. A plurality of circuits as in claim 10, wherein the at least one of the plurality of stages includes an adder circuit coupled to the first output terminal, the adder circuit coupled to receive the first and the second data sequence.

12. A plurality of circuits as in claim 10, wherein each stage of the second circuit further comprises respective signal paths for a third and a fourth data sequence and wherein said respective delay circuit has a different delay from said respective delay circuit of each other stage of the second circuit.

13. A plurality of circuits as in claim 12, further comprising:
- a first adder circuit coupled to the first output terminal, the first adder circuit coupled to receive the first and the second data sequence; and
- a second adder circuit coupled to the second output terminal, the second adder circuit coupled to receive the third and the fourth data sequence.

14. A plurality of circuits as in claim 9, wherein the second circuit further comprises a first input terminal and a first output terminal, the first input terminal coupled to receive the input sequence, the first output terminal coupled to receive at least the first data sequence and wherein the second circuit further comprises a second input terminal and a second output terminal, the second input terminal coupled to the first output terminal.

15. A plurality of circuits as in claim 14, further comprising an adder circuit coupled to the first output terminal, the first adder circuit coupled to receive the first and the second data sequence.

16. A circuit as in claim 9 connected to an output terminal of a serial circuit, the serial circuit, comprising:
   a plurality of delay circuits connected in series, a first of the delay circuits connected to an input terminal, each delay circuit having an equal delay;
   a plurality of logic circuits, each logic circuit having a first Input terminal coupled to a respective delay circuit and having a second Input terminal coupled to receive a respective data signal, the plurality of logic circuits producing a respective plurality of output signals; and
   an arithmetic circuit coupled to receive the respective plurality of output signals, the arithmetic circuit producing the input sequence in response to the plurality of output signals.

17. A circuit as in claim 16, wherein the serial circuit is a matched filter circuit and the arithmetic circuit is an adder circuit.

18. A circuit as in claim 9 connected to an input terminal of a serial circuit, the serial circuit, comprising:
   a plurality of delay circuits connected in series, a first of the delay circuits connected to the input terminal, each delay circuit having an equal delay;
   a plurality of logic circuits, each logic circuit having a first input terminal coupled to a respective delay circuit and having a second input terminal coupled to receive a respective data signal, the plurality of logic circuits producing a respective plurality of output signals; and
   an arithmetic circuit coupled to receive the respective plurality of output signals, the arithmetic circuit producing an output signal in response to the plurality of output signals.

19. A circuit as in claim 18, wherein the serial circuit is a matched filter circuit and the arithmetic circuit is an adder circuit.

20. A circuit for processing signals, comprising:
   a plurality of stages coupled to provide plural signal paths, each stage including respective signal paths for a first and a second data sequence, each stage further including a respective delay circuit having a different delay from said respective delay circuit of each other stage of the plurality of stages;
   an output terminal coupled to receive a combination of the first and the second data sequence;
   a plurality of delay circuits connected in series, a first of the delay circuits having an input terminal connected to the output terminal;
   a plurality of logic circuits, each logic circuit having a first input terminal coupled to a respective delay circuit and having a second input terminal coupled to receive a respective data signal, the plurality of logic circuits producing a respective plurality of output signals; and
   an arithmetic circuit coupled to receive the respective plurality of output signals, the arithmetic circuit producing a binary sequence in response to the plurality of output signals.

21. A circuit as in claim 20, wherein the plurality of delay circuits, the plurality of logic circuits, and the arithmetic circuit comprise a matched filter circuit, and wherein the arithmetic circuit is an adder circuit.

22. A circuit as in claim 20, wherein each delay circuit of the plurality of delay circuits has substantially the same delay.

23. A circuit for processing signals, comprising:
   a plurality of delay circuits connected in series, a first of the delay circuits connected to the input terminal;
   a plurality of logic circuits, each logic circuit having a first input terminal coupled to a respective delay circuit and having a second input terminal coupled to receive a respective data signal, the plurality of logic circuits producing a respective plurality of output signals;
   an arithmetic circuit coupled to receive the respective plurality of output signals, the arithmetic circuit producing an output signal in response to the plurality of output signals; and
   a plurality of stages coupled to provide plural signal paths, a first stage of the plurality of stages coupled to receive the output signal, each stage including respective signal paths for a first and a second data sequence, each stage further including a respective delay circuit having a different delay from said respective delay circuit of each other stage of the plurality of stages.

24. A circuit as in claim 23, wherein the plurality of delay circuits, the plurality of logic circuits, and the arithmetic circuit comprise a matched filter circuit, and wherein the arithmetic circuit is an adder circuit.

25. A circuit as in claim 23, wherein each delay circuit of the plurality of delay circuits has substantially the same delay.

* * * * *